US012010789B2

(12) United States Patent
Mori et al.

(10) Patent No.: US 12,010,789 B2
(45) Date of Patent: Jun. 11, 2024

(54) ACCELERATING CAVITY

(71) Applicants: MITSUBISHI HEAVY INDUSTRIES MACHINERY SYSTEMS, LTD., Hyogo (JP); INTER-UNIVERSITY RESEARCH INSTITUTE CORPORATION HIGH ENERGY ACCELERATOR RESEARCH ORGANIZATION, Ibaraki (JP)

(72) Inventors: Shingo Mori, Ibaraki (JP); Mitsuhiro Yoshida, Ibaraki (JP); Nobuyuki Shigeoka, Hyogo (JP)

(73) Assignees: MITSUBISHI HEAVY INDUSTRIES MACHINERY SYSTEMS, LTD., Kobe (JP); INTER-UNIVERSITY RESEARCH INSTITUTE CORPORATION HIGH ENERGY ACCELERATOR RESEARCH ORGANIZATION, Tsukuba (JP)

( * ) Notice: Subject to any disclaimer, the term of this patent is extended or adjusted under 35 U.S.C. 154(b) by 0 days.

(21) Appl. No.: 17/611,327

(22) PCT Filed: May 15, 2020

(86) PCT No.: PCT/JP2020/019533
§ 371 (c)(1),
(2) Date: Nov. 15, 2021

(87) PCT Pub. No.: WO2020/235507
PCT Pub. Date: Nov. 26, 2020

(65) Prior Publication Data
US 2022/0210904 A1 Jun. 30, 2022

(30) Foreign Application Priority Data
May 17, 2019 (JP) ................................ 2019-093924

(51) Int. Cl.
*H05H 9/04* (2006.01)
*H05H 7/18* (2006.01)
*H05H 9/00* (2006.01)

(52) U.S. Cl.
CPC .............. *H05H 9/048* (2013.01); *H05H 7/18* (2013.01); *H05H 9/005* (2013.01)

(58) Field of Classification Search
None
See application file for complete search history.

(56) References Cited

U.S. PATENT DOCUMENTS 5,037,602 A * 8/1991 Dabiri ...................... G21G 1/10 376/198
5,227,701 A * 7/1993 McIntyre ................ H01J 25/36 315/5.41

(Continued)

FOREIGN PATENT DOCUMENTS

JP 2017117730 A 6/2017

*Primary Examiner* — Srinivas Sathiraju
(74) *Attorney, Agent, or Firm* — HAUPTMAN HAM, LLP

(57) ABSTRACT

An accelerating cavity includes an electrically conductive cylindrical housing and a plurality of cells that are made of a dielectric material and have openings in respective central portions of the cells through which charged particles are allowed to pass. The cells are arranged inside the housing while being aligned in the axial direction of the central axis of the housing, and sandwiched by the housing in the axial direction of the central axis to be immobilized. The housing has grooves provided on portions thereof that support the respective cells and each having a depth that is one fourth of the wavelength of radio frequency waves for the acceleration mode that propagate through the cells.

10 Claims, 10 Drawing Sheets

(56) References Cited

U.S. PATENT DOCUMENTS

| | | | | |
|---|---|---|---|---|
| 6,899,831 | B1 * | 5/2005 | Foreman | B29D 11/00009 264/1.36 |
| 6,914,396 | B1 * | 7/2005 | Symons | H05H 7/18 315/501 |
| 8,552,667 | B2 * | 10/2013 | Allen | H05H 9/048 250/493.1 |
| 8,674,630 | B1 * | 3/2014 | Cornelius | H05H 7/20 315/501 |
| 8,942,351 | B2 * | 1/2015 | Cheung | H05H 9/048 378/65 |
| 10,029,493 | B2 * | 7/2018 | Kamigiku | B65H 23/0204 |
| 10,440,809 | B2 * | 10/2019 | Yoshida | H05H 7/18 |
| 10,609,807 | B2 * | 3/2020 | Suda | H05H 7/22 |
| 2005/0109879 | A1 * | 5/2005 | Patterson | F03H 99/00 244/53 R |
| 2009/0224700 | A1 * | 9/2009 | Chen | H05H 7/02 315/505 |
| 2012/0294423 | A1 * | 11/2012 | Cheung | H05H 9/02 378/65 |
| 2016/0147161 | A1 * | 5/2016 | Nikipelov | H01S 3/0903 355/67 |
| 2018/0022119 | A1 * | 1/2018 | Kamigiku | B41J 13/0009 347/16 |
| 2018/0081278 | A1 * | 3/2018 | Nikipelov | G21K 1/10 |
| 2019/0008028 | A1 * | 1/2019 | Okihira | H05H 7/02 |
| 2019/0014653 | A1 * | 1/2019 | Yoshida | H05H 7/18 |
| 2022/0210904 | A1 * | 6/2022 | Mori | H05H 7/18 |

* cited by examiner

ACCELERATING CAVITY

RELATED APPLICATIONS

The present application is a National Phase of International Application Number PCT/JP2020/019533 filed May 15, 2020 and claims priority to Japanese Application Number 2019-093924 mailed May 17, 2019.

FIELD

The present invention relates to an accelerating cavity.

BACKGROUND

A radio frequency accelerating cavity accelerates charged particles such as electrons by generating an accelerating electric field when radio frequency waves are input thereto. Patent Literature 1 discloses an accelerating cavity configured to have a smaller conduction loss and consequent higher power efficiency by containing, inside a dielectric material with low radio frequency loss, a large part of radio frequency waves that serve as acceleration energy.

CITATION LIST

Patent Literature

Patent Literature 1: Japanese Patent Application Laid-open No. 2017-117730

SUMMARY

Technical Problem

The accelerating cavity according to Patent Literature 1 has a structure obtained by stacking cells, each made of a dielectric material, one on top of another and thus arranging the cells inside a housing made of an electrical conductor. With this structure, factors such as dimension errors of the cells may result in difficulty controlling the resonance frequency of radio frequency waves. This means that a structure that enables easy control of resonance frequency while having a lower conduction loss and consequent higher power efficiency is needed.

The present invention has been made in view of the above need and is directed to providing an accelerating cavity that enables easy control of resonance frequency while having a lower conduction loss and consequent higher power efficiency.

Solution to Problem

An accelerating cavity according to the present invention includes an electrically conductive cylindrical housing; and a plurality of cells made of a dielectric material and having openings in respective central portions of the cells through which charged particles are allowed to pass, the cells being arranged inside the housing while being aligned in an axial direction of a central axis of the housing, and sandwiched by the housing in the axial direction of the central axis to be immobilized. Grooves each having a depth that is one fourth of a wavelength of radio frequency waves for an acceleration mode that propagate through the cells are provided on portions of the housing that support the cells.

Therefore, the cells are sandwiched by the housing in the axial direction of the central axis to be immobilized, whereby the arrangement of the cells inside the housing can be stabilized in an appropriate position. The resonance frequency can be thus controlled easily. In addition, the grooves each having a depth that is one fourth of the wavelength of radio frequency waves for the acceleration mode that propagate through the cells are provided on portions of the housing that support the cells, whereby a radio frequency wave for the acceleration mode that propagates through each of the cell outward and the radio frequency wave that has been reflected by the corresponding groove cancel out each other. That is, the grooves serve as short-circuit surfaces for radio frequency waves that have a frequency for the acceleration mode. This structure can prevent radio frequency waves in the accelerating cavity from leaking out from the housing. Thus, an accelerating cavity that enables easy control of resonance frequency while allowing for a smaller conduction loss and consequent higher power efficiency can be obtained.

Further, while the housing may be formed of a plurality of housing members included in the housing joined together in the axial direction of the central axis, one of the cells may be sandwiched between adjacent housing members.

Therefore, the cells can be easily and reliably immobilized inside the housing in the axial direction of the central axis.

Further, the plurality of housing members may be joined together by electron beam welding or electroforming.

Therefore, the housing members can be reliably joined together while changes in dimensions thereof can be prevented with a reduced quantity of heat input thereto. In addition, the strength of the joint between the housing members is enhanced, whereby thermal conduction is facilitated, which makes it possible to control the temperature of the entirety of the housing by cooling parts thereof.

Further, the plurality of cells may be arranged with a gap between adjacent cells in the axial direction of the central axis.

Therefore, the inside and the outside of each of the cells are thus left in communication with each other inside the housing. Therefore, the air inside the cells can be easily evacuated. For example, when respective cylindrical parts of the cells inside the housing form a multiple structure, the inside and the outside of each of the cells can be thus left in communication with each other inside the housing, whereby air can be easily evacuated.

Further, the housing may include a communication part causing inside and outside of the housing to communicate with each other in a radial direction perpendicular to the central axis.

Therefore, the air inside the housing can be easily evacuated through the communication part.

Further, the communication part may be formed in a slit shape along an outer circumferential direction of the housing.

Therefore, the air can be evacuated over a range that extends along an outer circumferential direction of the housing.

Further, the cells may be arranged with parts of the cells exposed outside the housing through the communication part. The accelerating cavity further may include a cover part covering an outer surface of a portion of each of the cells, the portion being exposed to the communication part; and a flow path member arranged in contact with the cover part and having a cooling medium flowing in the flow path member.

Therefore, the cells can be easily cooled.

Further, the accelerating cavity may further include an elastically deforming part configured to impart elastic force to the corresponding cell inward in a direction perpendicular to the central axis.

Therefore, even when there is a difference in a thermal expansion coefficient between the housing and each of the cells, relative displacement between the housing and the cell due to thermal deformation thereof can be absorbed.

Further, the elastically deforming part may be integral with the housing.

Therefore, relative displacement between the housing and each of the cells due to thermal deformation can be absorbed without separately including elastically deforming members.

The accelerating cavity may further include a getter member provided inside the housing and configured to remove a foreign object in the housing.

Therefore, foreign objects inside the housing can be easily removed.

Advantageous Effects of Invention

According to the present invention, it is possible to provide an accelerating cavity that enables easy control of resonance frequency while having a lower conduction loss and consequent higher power efficiency.

DESCRIPTION OF EMBODIMENTS

The following describes embodiments of an accelerating cavity according to the present invention based on the drawings. These embodiments are not intended to limit this invention. In addition, constituent elements in the following embodiments include those that can be replaced by the skilled person or those that are substantially identical.

First Embodiment

Figure 1:
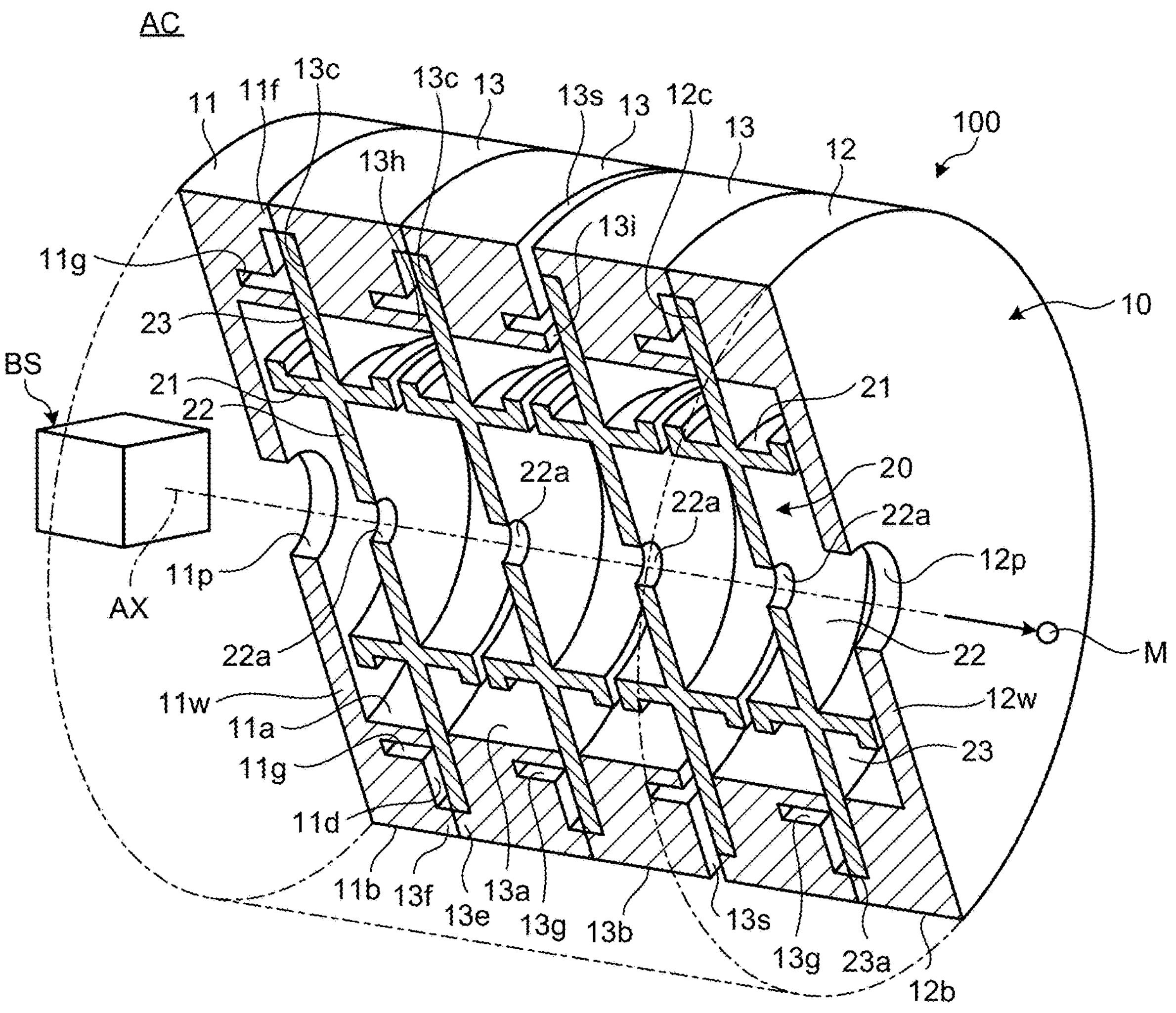
FIG. 1 is a perspective sectional view illustrating an example of an accelerating cavity according to a first embodiment.

FIG. 1 is a perspective sectional view illustrating an example of an accelerating cavity 100 according to a first embodiment. FIG. 1 illustrates a section of the accelerating cavity 100 taken along a plane that passes through the central axis thereof. The accelerating cavity 100 illustrated in FIG. 1 generates an accelerating electric field in the inside thereof when radio frequency waves are input thereto and thereby accelerates charged particles M, such as electrons, emitted from a beam source BS. An accelerator AC is composed of the accelerating cavity 100 and the beam source BS. The accelerator AC is applied in various fields including: academic fields in which example applications thereof include high-energy physics experiments and radiation facilities; medical fields in which example applications thereof include radiation treatment and examinations; and industrial fields in which example applications thereof include non-destructive testing. When description is given in relation to the axial direction of the central axis AX out of directions relative to the accelerating cavity 100, one side (a side that charged particles M enter) that faces the beam source BS in those directions is referred to as the entrance side, and another side (a side from which the charged particles exit) that faces away from the entrance side in these directions is referred to as the exit side.

The accelerating cavity 100 includes a housing 10 and a plurality of cells 20. The housing 10 is, for example, formed in a cylindrical shape using an electrically conductive material, examples of which include: pure metal such as oxygen-free copper; and a material obtained by silver-plating or copper-plating stainless steel. Thus forming the housing 10 ensures that the outer surface thereof is electrically conductive.

The housing 10 has a structure obtained by joining together a plurality of housing members (11, 12, 13) arranged side by side in the axial direction of the central axis AX. The housing members include an entrance side member 11 that the charged particles M emitted from the beam source BS enter, an exit side member 12 from which the charged particles M exit, and a plurality of trunk members 13 arranged between the entrance side member 11 and the exit side member 12.

The entrance side member 11 has, for example, a cylindrical shape and includes a wall part 11*w* in an end part thereof on the entrance side (on a side facing the beam source BS) thereof in the axial direction of the central axis AX of the housing 10. The entrance side member 11 has a circular opening 11*p* in a portion of the wall part 11*w* that includes the central axis AX of the housing 10. The charged particles M entering the housing 10 pass through the opening 11*p*. The entrance side member 11 includes an inner circumferential surface 11*a* and an outer circumferential surface 11*b*. The inner circumferential surface 11*a* is formed so as to be flush with an inner circumferential surface 12*a* to be described below of the exit side member 12 and with respective inner circumferential surfaces 13*a* to be described below of the trunk members 13. The outer circumferential surface 11*b* is formed so as to be flush with an outer circumferential surface 12*b* to be described below of the exit side member 12 and with respective outer circumferential surfaces 13*b* to be described below of the trunk members 13. The inner circumferential surface 11*a* may not necessarily be flush with the inner circumferential surface 12*a* of the exit side member 12 or with the respective inner circumferential surfaces 13*a* of the trunk members 13. The outer circumferential surface 11*b* may not necessarily be flush with the outer circumferential surface 12*b* of the exit side member 12 or with the respective outer circumferential surfaces 13*b* of the trunk members 13.

The exit side member 12 has, for example, a cylindrical shape and includes a wall part 12*w* in an end part thereof on the exit side thereof in the axial direction of the central axis AX of the housing 10. The exit side member 12 has a circular opening 12*p* in a portion of the wall part 12*w* that includes the central axis AX of the housing 10. The charged particles M exiting the housing 10 pass through the opening 12*p*. The exit side member 12 includes the inner circumferential surface 12*a* and the outer circumferential surface 12*b*.

Figure 3:
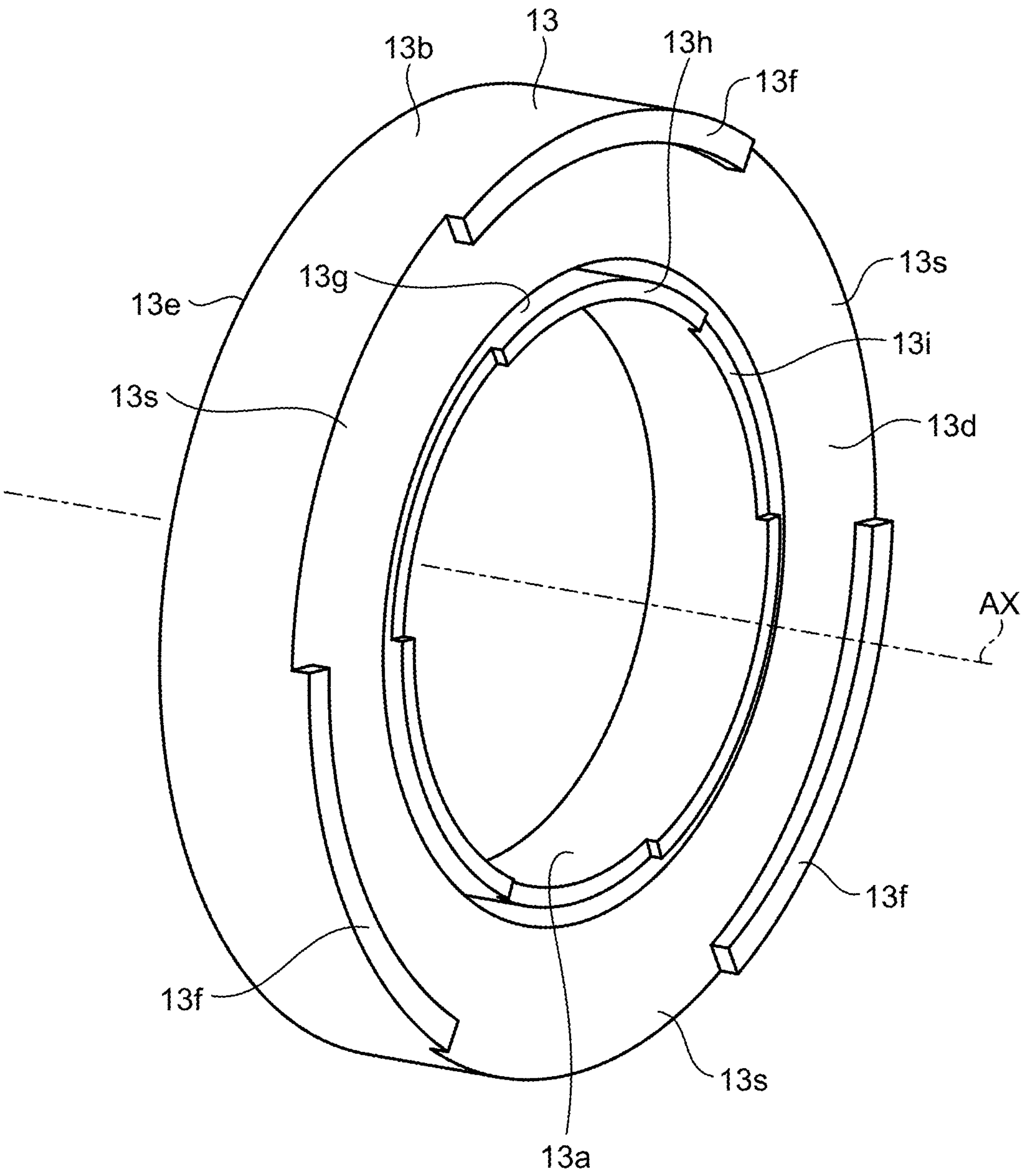
FIG. 3 is a perspective view illustrating an example of a trunk member.
Figure 4:
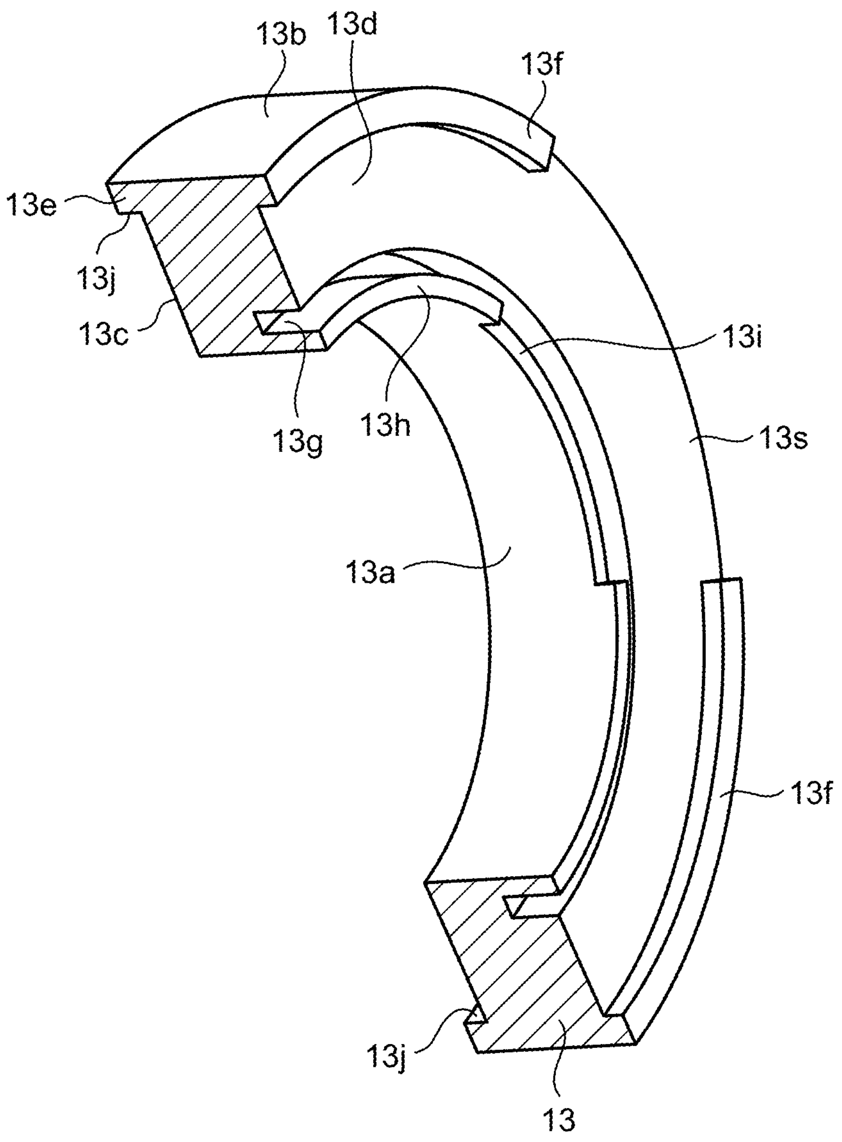
FIG. 4 is a view illustrating an example of a sectional structure of the trunk member in FIG. 3 taken along a plane that passes through a central axis AX.

FIG. 3 is a perspective view illustrating an example of the trunk member 13. FIG. 4 is a view illustrating an example of a sectional structure of the trunk member 13 in FIG. 3 taken along a plane that passes through the central axis AX. As illustrated in FIG. 3 and FIG. 4, the trunk member 13 includes the inner circumferential surface 13*a*, the outer circumferential surface 13*b*, an entrance side end surface 13*c*, an exit side end surface 13*d*, an entrance side projecting part 13*e*, exit side projecting parts 13*f*, a groove 13*g*, and salient parts 13*h*.

The inner circumferential surface 13*a* and the outer circumferential surface 13*b* are, for example, cylindrical surfaces and are provided so that the central axes thereof match the central axis AX of the housing 10. The entrance side end surface 13*c* is an end surface on the entrance side in the axial direction of the central axis AX. The exit side end surface 13*d* is an end surface on the exit side in the axial direction of the central axis AX. The entrance side end surface 13*c* and the exit side end surface 13*d* have, for example, planar shapes.

The entrance side projecting part 13*e* is provided on an outer circumferential region of the entrance side end surface 13*c*. The entrance side projecting part 13*e* is formed continuously over the entire circumference in the circumferential direction. The entrance side projecting part 13*e* is provided in the form of a step on the entrance side end surface 13*c* and forms an inner surface 13*j*. The exit side projecting parts 13*f* are provided on an outer circumferential region of the exit side end surface 13*d*. The exit side projecting parts 13*f* are provided, for example, with a certain pitch in the circumferential direction. The exit side projecting parts 13*f* can be thus arranged with the axial symmetry thereof maintained. Each of the exit side projecting parts 13*f* is provided in the form of a step on the exit side end surface 13*d*.

The groove 13*g* is provided in an annular shape on the exit side end surface 13*d*. The groove 13*g* is formed to have a depth d in a direction from the exit side end surface 13*d* toward the entrance side (See FIG. 2). This depth d is set to a depth that is one fourth of the wavelength of radio frequency waves for an acceleration mode that are input to the accelerating cavity 100. Therefore, radio frequency waves for the acceleration mode that propagate through each of the cells 20 outward from the inside of the housing 10 are reflected by the corresponding groove 13*g*, and the phases of the radio frequency wave and the reflected radio frequency wave are different only by half the wavelength. Thus, a radio frequency wave for the acceleration mode that propagates through each of the cells 20 outward and the radio frequency wave that has been reflected by the corresponding groove 13*g* cancel out each other. That is, the grooves 13*g* serve as short-circuit surfaces for radio frequency waves of a frequency for the acceleration mode. This structure can prevent radio frequency waves in the accelerating cavity 100 from leaking out from the housing 10. The respective grooves 13*g* may alternatively be provided on the entrance side end surfaces 13*c*. The individual trunk members 13 may be configured differently from one another as to whether or not the grooves 13*g* are provided on the entrance side end surfaces 13*c* or on the exit side end surfaces 13*d*.

The salient parts 13*h* are provided on an inner circumferential region of the exit side end surface 13*d*. The salient parts 13*h* are provided with a certain pitch in the circumferential direction. For example, the salient parts 13*h* can be provided in respective ranges the phase of which corresponds to the phase of the exit side projecting parts 13*f* in a direction of rotation about the central axis AX. Thus, the salient parts 13*h* can be arranged with the axial symmetry thereof maintained.

When the trunk members 13 are joined together, the exit side projecting part 13*f* of one of the trunk members 13 and the entrance side projecting part 13*e* of another are brought into contact with each other. In this state, a space for housing therein an annular part 23 described below of a corresponding one of the cells 20 is formed in a region surrounded by the entrance side end surface 13*c*, the entrance side projecting part 13*e*, the exit side end surface 13*d*, and the exit side projecting parts 13*f* of each adjacent two of the trunk members 13. In addition, a slit part 13*s* is formed between each adjacent two of the exit side projecting parts 13*f* on the outer circumferential region of the exit side end surface 13*d* in the circumferential direction thereof. The slit parts 13*s* are formed along the circumferential direction of the outer circumferential surfaces 13*b*. Furthermore, each of the salient parts 13*h* faces a corresponding one of the entrance side end surfaces 13*c* with a gap therebetween. The annular part 23 described below of one of the cells 20 is sandwiched between the corresponding salient parts 13*h* and the corresponding entrance side end surface 13*c*. A recessed part 13*i* is formed between each adjacent two of the salient parts 13*h* in the circumferential direction. The recessed parts 13*i* communicate with corresponding ones of the slit parts 13*s* described above. Therefore, the inner circumferential side and the outer circumferential side of each of the trunk members 13 are caused to communicate with each other via the recessed parts 13*i* thereof and the corresponding slit parts 13*s*. The recessed part 13*i* and the corresponding slit part 13*s* together form a communication part that causes the inside and the outside of the corresponding trunk member 13 to communicate in radial directions thereof perpendicular to the central axis AX.

The structure of an exit side end part of the entrance side member 11 is the same as that of the exit side end part of the trunk member 13. That is, the entrance side member 11 includes, in the exit side end part thereof, an exit side end surface 11*d*, exit side projecting parts 11*f*, a groove 11*g*, and salient parts 11*h*. In addition, the structure of an entrance side end part of the exit side member 12 is the same as that of the entrance side end part of the trunk member 13. That is, the exit side member 12 includes, in the entrance side end part thereof, an entrance side end surface 12*c*, and an entrance side projecting part 12*e*. The same description as applied to the trunk member 13 described above is applicable to a structure in a part of the entrance side member 11 on the exit side thereof and a structure in a part of the exit side member 12 on the entrance side thereof.

Figure 2:
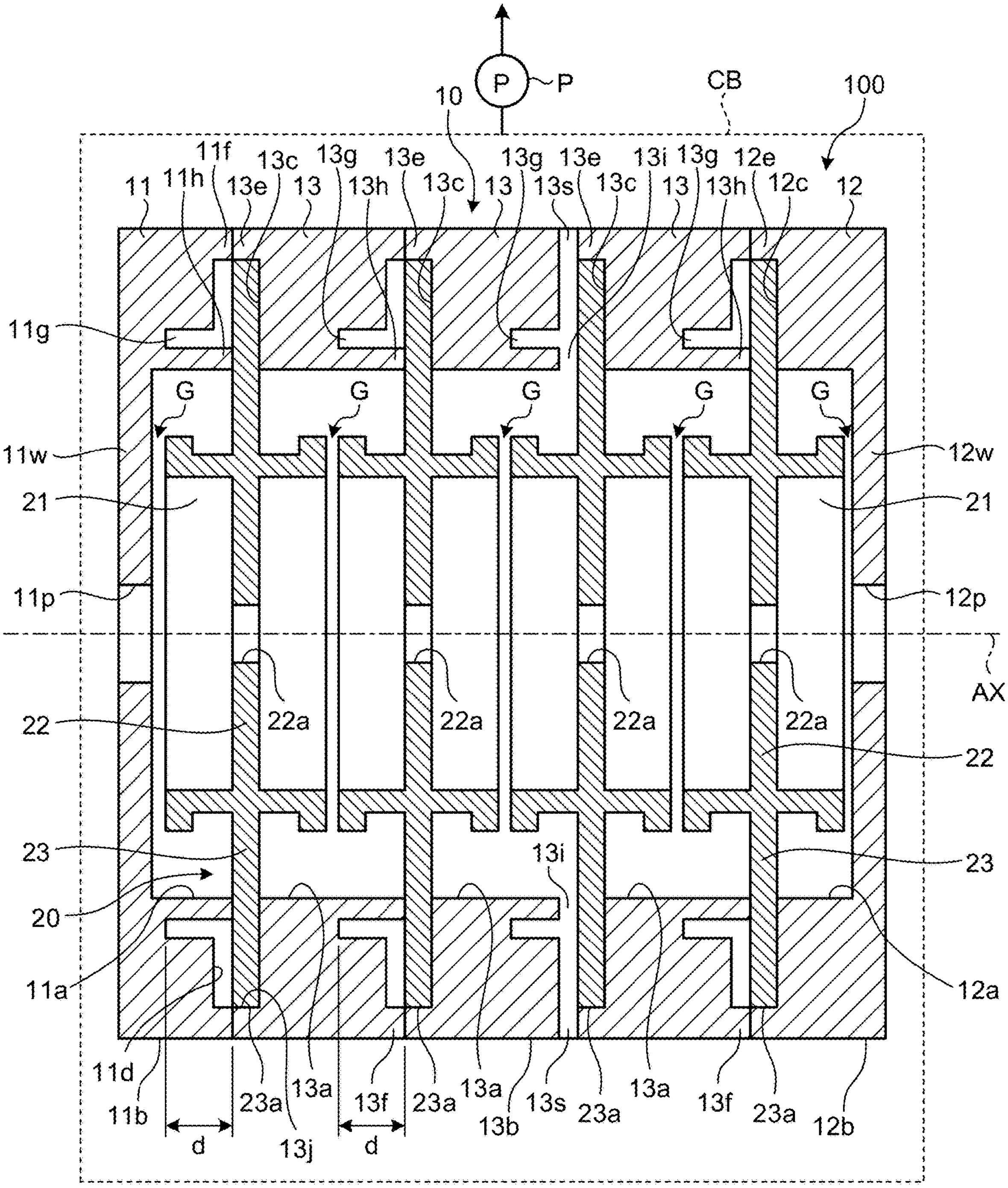
FIG. 2 is a sectional view illustrating an example of the accelerating cavity according to the present embodiment.

Therefore, the groove 11*g* is formed in such a manner as to have a depth d from the exit side end surface 11*d* toward the entrance side (See FIG. 2). The depth d of the groove 11*g* can be set to the same value as the depth d of the groove 13*g*.

When the entrance side member 11 and one of the trunk members 13 are joined to each other, the exit side projecting parts 11*f* of the entrance side member 11 are brought into contact with the corresponding entrance side projecting part 13*e*. In this state, a space for housing therein the annular part 23 described below of one of the cells 20 is formed in a region surrounded by the exit side end surface 11*d*, the exit side projecting parts 11*f*, the entrance side end surface 13*c*, and the entrance side projecting part 13*e*. In addition, a slit part (not illustrated) is formed between each adjacent two of the exit side projecting parts (not illustrated) on the outer circumferential region of the exit side end surface 11*d* in the circumferential direction thereof. The slit parts 13*s* are formed along the circumferential direction of the outer circumferential surfaces 13*b*. Furthermore, each of the salient parts 11*h* faces the corresponding entrance side end surface 13*c* with a gap therebetween. The annular part 23 described below of one of the cells 20 is sandwiched between each of the salient parts 11*h* and the entrance side end surface 13*c*. A recessed part (not illustrated) is formed between each adjacent two of the salient parts 11*h* in the circumferential direction. The recessed parts (not illustrated) communicate with corresponding ones of the slit parts described above. Therefore, the inner circumferential side and the outer circumferential side of the entrance side member 11 and the trunk member 13 are caused to communicate with each other via the recessed parts 11*i* and the slit parts 13*s*.

In the same manner, when one of the trunk members 13 and the exit side member 12 are joined to each other, the exit side projecting parts 13*f* of the trunk member 13 are brought into contact with the entrance side projecting part 12*e* of the exit side member 12. In this state, a space for housing therein the annular part 23 described below of one of the cells 20 is formed in a region surrounded by the exit side end surface 13*d* and the exit side projecting parts 13*f* of the trunk member 13 and the entrance side end surface 12*c* and the entrance side projecting part 12*e* of the exit side member 12. In addition, the slit part 13*s* is formed between each adjacent two of the exit side projecting parts 13*f* on the outer circumferential region of the exit side end surface 13*d* in the circumferential direction thereof. The slit parts 13*s* are formed along the circumferential direction of the outer circumferential surfaces 13*b*. Furthermore, each of the salient parts 13*h* faces the entrance side end surface 12*c* with a gap therebetween. The annular part 23 described below of one of the cells 20 is sandwiched between each of the salient parts 13*h* and the entrance side end surface 12*c*. A recessed part 13*i* is formed between each adjacent two of the salient parts 13*h* in the circumferential direction. The recessed parts 13*i* communicate with corresponding ones of the slit parts 13*s* described above. Therefore, the inner circumferential side and the outer circumferential side of the trunk member 13 and the exit side member 12 are caused to communicate with each other via the recessed parts 13*i* and the slit parts 13*s*. The salient parts 13*h* may be provided so as to be spaced from the corresponding annular part 23. In this case, the annular part 23 is joined to the entrance side end surface 12*c*.

The cells 20 are aligned in the axial direction of the central axis AX. Each of the cells 20 includes a cylindrical part 21, a circular disc part 22, and the annular part 23. The cell 20 is made of a dielectric material and is used without having a metallurgical coating or the like applied to the outer surface thereof. The cell 20 may have a local metallurgical coating or dielectric coating applied to the outer surface thereof. The dielectric material used for the cell 20 is a dielectric material, the dielectric loss of which is low, examples of which include ceramics such as alumina or sapphire.

The cylindrical part 21 is arranged in such a manner that the central axis thereof is coaxial with the central axis AX of the housing 10. The cylindrical part 21 has a smaller diameter than the inner circumferential surface 13*a* of the trunk member 13. Thus, the cylindrical part 21 is housed to the inner side of the trunk member 13. The diameters of the respective cylindrical parts 21 of the cells 20 may be all equal or may be different among the cells 20, for example, in such a manner that the diameters of the cylindrical parts 21 of the cells 20 at end regions in the axial direction of the central axis AX are set larger than the diameters of the cylindrical parts 21 in the central region. A gap G is provided between the cylindrical parts 21 of adjacent cells 20 in the axial direction of the central axis AX. That is, the cells 20 are arranged with the gap G between the adjacent cells 20 in the axial direction of the central axis AX. In addition, the cells 20 that are arranged at opposite ends in the axial direction of the central axis AX are arranged with the gap G between one of these cells 20 and the entrance side member 11 and with the gap G between the other cell 20 and the exit side member 12. Thus, the inside and the outside of the cylindrical part 21 are left in communication with each other inside the housing 10.

The circular disc part 22 is arranged to the inner side of the cylindrical part 21. The circular disc part 22 is arranged in a central portion of the cylindrical part 21 in the axial direction of the central axis AX. The circular disc part 22 has the circular opening 22*a* in a portion thereof that includes the central axis AX. The charged particles M pass through the opening 22*a*. The diameter of the opening 22*a* is smaller than the diameter of the cylindrical part 21. The cylindrical part 21 is placed in a direction perpendicular to the plane of the circular disc part 22.

The annular part 23 is arranged to the outer side of the cylindrical part 21. The annular part 23 is arranged in a central portion of the cylindrical part 21 in the axial direction of the central axis AX. The annular part 23 has the same thickness as the circular disc part 22 in the axial direction of the central axis AX. Therefore, the circular disc part 22 and the annular part 23 have structures formed in flat plate shapes with the cylindrical part 21 therebetween.

The annular part 23 is sandwiched between adjacent two of the housing members of the housing 10 in the axial direction of the central axis AX. The annular part 23 of the cell 20 arranged at one end in the axial direction of the central axis AX is sandwiched between each of the salient parts 11*h* of the entrance side member 11 and the entrance side end surface 13*d* of the trunk member 13, and the annular part 23 of the cell 20 arranged at the other end is sandwiched between each of the salient parts 13*h* of the trunk member 13 and the entrance side end surface 21*d* of the exit side member 12. In addition, each of the annular parts 23 of the cells 20 arranged in the central portions in the axial direction of the central axis AX is sandwiched between corresponding two of the trunk members 13, that is, between each of the salient parts 13*h* of one of the two trunk members 13 and the entrance side projecting part 13*e* of the other trunk member 13. This structure causes one of the cells 20 to be sandwiched between the adjacent housing members of the housing 10. Furthermore, in the present embodiment, an outer circumferential surface 23*a* of the annular part 23 is supported by the inner surface 13*j* of the entrance side projecting part 13*e*.

In the accelerating cavity 100, an electric field in an acceleration direction is formed in the neighborhood of the beam axis of the charged particles M that pass therethrough. The circular disc part 22 of each of the cells 20 is placed to the inner side of the cylindrical part 21 so that a plate surface of the circular disc part 22 of the cell 20 can be set in a direction perpendicular to the beam axis. As a result, in a region to the inner side of the openings 22*a* of the circular disc parts 22, the accelerating electric field can be concentrated in a direction in which the beam axis extends, whereby a higher shunt impedance can be obtained.

The accelerating cavity 100 structured in the above-described manner, for example, is housed inside a chamber CB and can be depressurized by a pump P. The inside of the accelerating cavity 100 is depressurized by having the chamber CB depressurized by the pump P. In the accelerating cavity 100 in the present embodiment, the air inside the cylindrical part 21 of each of the cells 20 is evacuated, for example, through the opening 11*p* and the opening 12*p* of the housing 10. In addition, for example, the air in the outside of the cylindrical parts 21 of the respective cells 20 is evacuated through the recessed parts 13*i* and the slit parts 13*s* of the housing 10. In the present embodiment, the cylindrical parts 21 of adjacent cells 20 are arranged with the gap G therebetween, whereby the air inside the cylindrical parts 21 of the respective cells 20 can be evacuated from the gaps G and through the recessed parts 13*i* and the slit parts 13*s*. The air can be thus evacuated with the axial symmetry maintained.

As described above, the accelerating cavity 100 according to the present embodiment includes: the electrically conductive cylindrical housing 10; and the cells 20 that are made of a dielectric material and have the openings 22*a* in respective central portions of the cells through which the charged particles M are allowed to pass, the cells being arranged inside the housing 10 while being aligned in the axial direction of the central axis AX of the housing 10, and respectively sandwiched by the housing 10 in the axial direction of the central axis AX to be immobilized. The housing 10 has the grooves 13*g* provided on portions thereof that support the respective cells 20 and each having a depth that is one fourth of the wavelength of radio frequency waves for the acceleration mode that propagate through the cells 20.

Therefore, the cells 20 are sandwiched by the housing 10 in the axial direction of the central axis AX to be immobilized, whereby the arrangement of the cells 20 inside the housing 10 can be stabilized in appropriate positions. Thus, the resonance frequency can be easily controlled. In addition, the grooves 13*g* each having a depth that is one fourth of the wavelength of radio frequency waves for the acceleration mode that propagate through the cells 20 are provided on portions of the housing 10 that support the respective cells 20, whereby a radio frequency wave for the acceleration mode that propagates through each of the cells 20 outward and the radio frequency wave that has been reflected by the corresponding groove 13*g* cancel out each other. That is, the grooves 13*g* serve as short-circuit surfaces for radio frequency waves having a frequency for the acceleration mode. This structure can prevent radio frequency waves in the accelerating cavity 100 from leaking out from the housing 10. Thus, the accelerating cavity 100 that enables easy control of resonance frequency while allowing for a smaller conduction loss and consequent higher power efficiency can be obtained.

Furthermore, the housing 10 may be formed by joining, in the axial direction of the central axis AX, the housing members (11, 12, 13) included in the housing 10, and a corresponding one of the cells 20 may be sandwiched between each adjacent two of the housing members (11, 12, 13). Therefore, the cells 20 can be easily and reliably immobilized inside the housing 10 in the axial direction of the central axis AX.

Moreover, the cells 20 may be arranged with the gap G between adjacent two of the cells 20 in the axial direction of the central axis AX. Therefore, the inside and the outside of each of the cells 20 are thus left in communication with each other inside the housing 10. Therefore, the air inside the cells 20 can be easily evacuated. For example, when the inside of the housing 10 has a multiple structure, the inside and the outside of each of the cells 20 can be thus left in communication with each other inside the housing 10, whereby easier air evacuation is enabled.

The housing 10 may include a communication part that causes the inside and the outside of the housing 10 to communicate with each other in radial directions thereof perpendicular to the central axis AX. Therefore, the air inside the housing 10 can be easily evacuated through the communication part.

Furthermore, the communication part may be formed in a slit shape along the outer circumferential direction of the housing 10. Therefore, the air can be evacuated over a range that extends along the outer circumferential direction of the housing 10.

Second Embodiment

Figure 5:
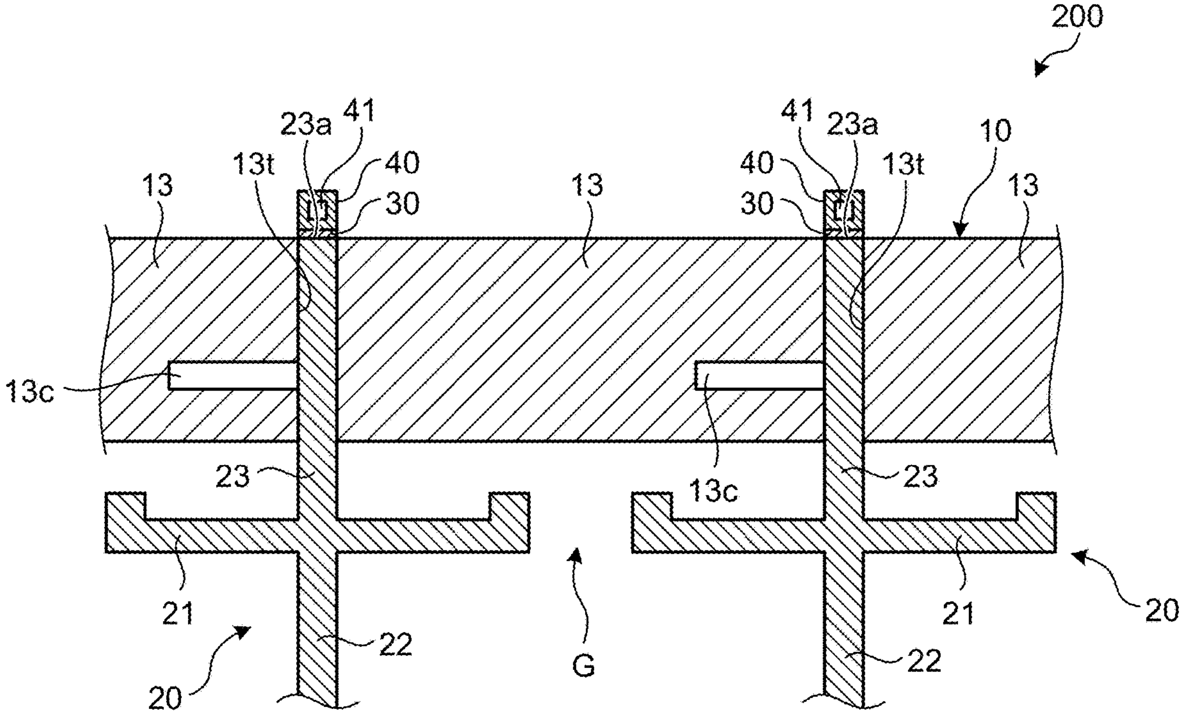
FIG. 5 is a sectional view illustrating an example of an accelerating cavity according to a second embodiment.

FIG. 5 is a sectional view illustrating an example of an accelerating cavity 200 according to a second embodiment. FIG. 5 illustrates a part of a section of the accelerating cavity 200. As illustrated in FIG. 5, the accelerating cavity 200 includes a housing 110 and the cells 20. In each of the trunk members 13, the housing 110 includes a communication part 13*t* that causes the inner circumferential side of the trunk member 13 and the outer circumferential side to communicate thereof. The communication part 13*t* is provided in such a manner as to penetrate a part of the trunk member 13 between the inner circumferential surface and the outer circumferential surface thereof.

In the cells 20, the respective annular parts 23 are arranged in the corresponding communication parts 13*t*. The respective outer circumferential surfaces 23*a* of the annular parts 23 are arranged in such a manner as to be left exposed outside the housing 10 through the corresponding communication parts 13*t*. On each of the outer circumferential surfaces 23*a*, a cover part 30 is arranged. The cover part 30 is arranged in a position such that the outer circumferential surface 23*a*, which is an outer surface of a portion of the corresponding cell 20 that is exposed outside through the corresponding communication part 13*t*, is covered thereby. Therefore, the outer circumferential surface 23*a* is left exposed outside the housing 10 through the communication part 13*t* but covered by the cover part 30. The cover part 30 is formed using a material having a high thermal conductivity, examples of which include a metallic material. On the cover part 30, a flow path member 40 is arranged. The flow path member 40 is configured to have a cooling medium 41, such as water, flowing therein. The other structures are the same as those of the accelerating cavity 100 in the first embodiment.

Thus, the accelerating cavity 200 according to the second embodiment further includes: the cover part 30 that, by being arranged in a position in which a part of the corresponding cell 20 is exposed outside the housing 10, covers the outer surface of a portion of the corresponding cell 20 that is exposed to the communication part; and the flow path member 40 arranged in contact with the cover part 30 and configured to have the cooling medium 41 flowing therein. The cooling medium 41 that flows in the flow path member 40 cools the annular part 23 via the cover part 30. Therefore, the cells 20 can be easily cooled.

Third Embodiment

Figure 6:
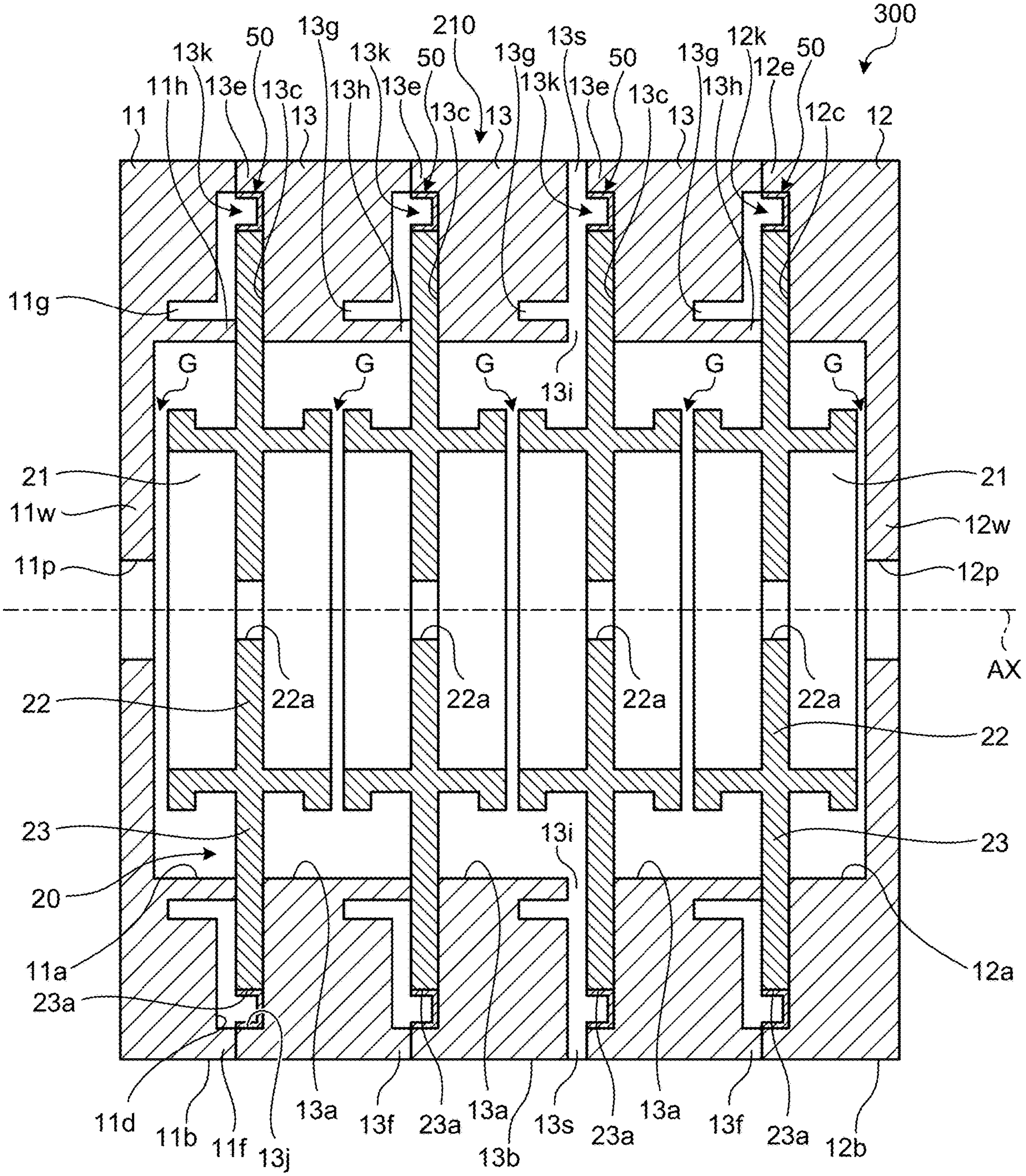
FIG. 6 is a sectional view illustrating an example of an accelerating cavity according to a third embodiment.

FIG. 6 is a sectional view illustrating an example of an accelerating cavity 300 according to a third embodiment. As illustrated in FIG. 6, the accelerating cavity 300 includes a housing 210 and the cells 20. The housing 210 has a space 12*k* provided between an inner surface 12*j* of the entrance side projecting part 12*e* in the exit side member 12 and the outer circumferential surface 23*a* of the annular part 23 in the corresponding cell 20. In addition, the housing 210 has a space 13*k* provided between the inner surface 13*j* of the entrance side projecting part 13*e* in each of the trunk members 13 and the outer circumferential surface 23*a* of the annular part 23 in the corresponding cell 20. In each of the space 12*k* and the space 13*k*, a spring part (elastically deforming part) 50 is arranged.

Figure 7:
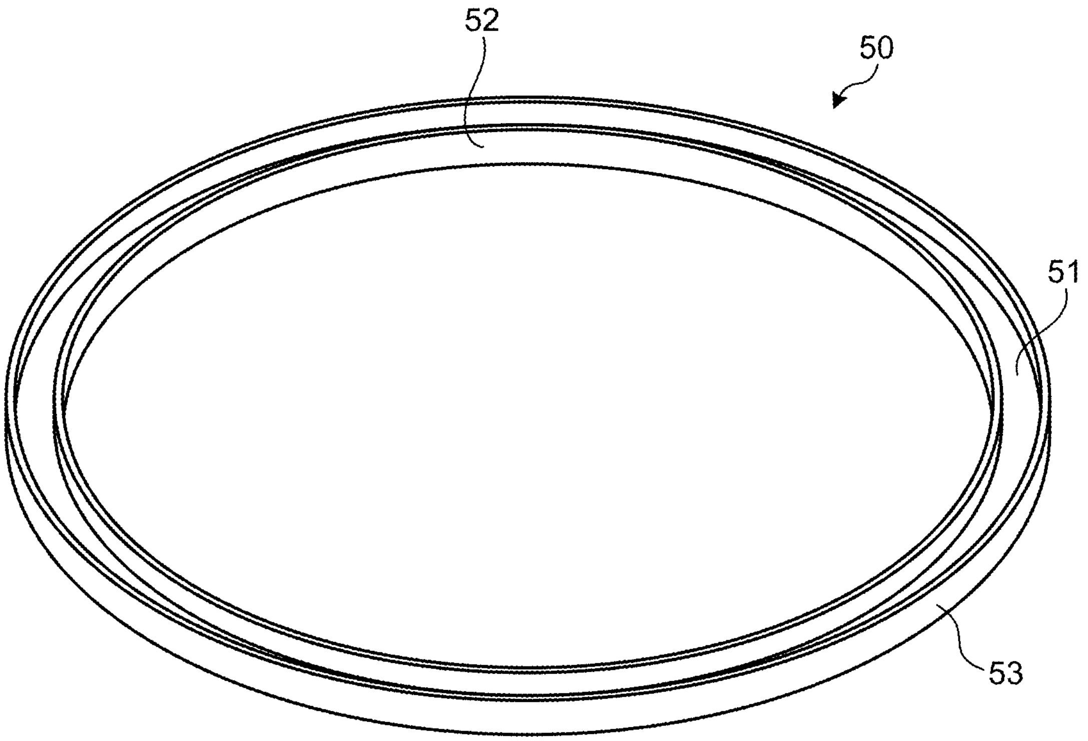
FIG. 7 is a perspective view illustrating an example of a spring part according to the present embodiment.

As illustrated in FIG. 7, the spring part 50 is formed in an annular shape and includes a base part 51, an inner circumferential part 52, and an outer circumferential part 53. The spring part 50 is arranged with the base part 51 thereof making contact with a corresponding one of the entrance side end surface 12*c* of the exit side member 12 and the entrance side end surfaces 13*c* of the corresponding trunk members 13, with the inner circumferential part 52 thereof making contact with the outer circumferential surface 23*a* of the annular part 23 of the corresponding cell 20, and with the outer circumferential part 53 thereof making contact with the inner surface 13*j* of the corresponding entrance side projecting part 13*e*. The other structures are the same as those of the accelerating cavity 100 in the first embodiment.

Thus, the accelerating cavity 300 according to the third embodiment further includes the spring parts 50 as elastically deforming parts configured to impart elastic force to the corresponding cells 20 inward in directions perpendicular to the central axis AX. Therefore, even when there is a difference in a thermal expansion coefficient between the housing 10 and each of the cells 20, relative displacement between the housing 10 and the cell 20 due to thermal deformation thereof can be absorbed. As the elastically deforming parts, other elastic members may be used in place of the spring parts 50.

Fourth Embodiment

Figure 8:
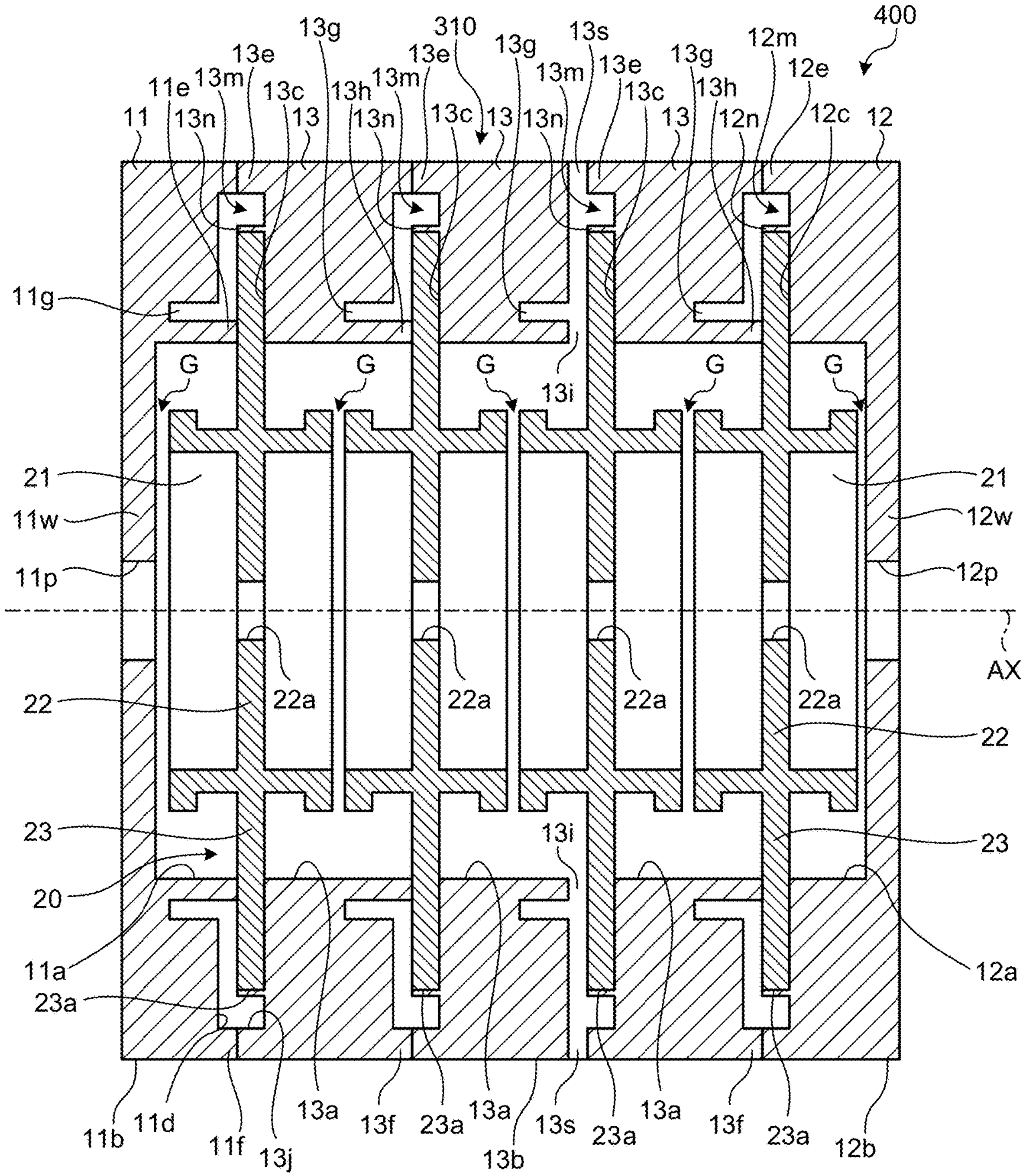
FIG. 8 is a sectional view illustrating an example of an accelerating cavity according to a fourth embodiment.

FIG. 8 is a sectional view illustrating an example of an accelerating cavity 400 according to a fourth embodiment. As illustrated in FIG. 8, the accelerating cavity 400 includes a housing 100 and the cells 20. The housing 100 has a structure that includes, as the elastically deforming parts, cylindrical piece parts 12*n* and 13*n* arranged in spaces 12*m* and 13*m*, in place of the spring parts 50 arranged in the spaces 12*k* and 13*k* in the third embodiment. That is, the elastically deforming parts are integral with the housing 10. The other structures are the same as those of the accelerating cavity 300 in the third embodiment.

Thus, the cylindrical piece parts 12*n* and 13*n*, which are integral with the housing 10, may serve as the elastically deforming parts in the accelerating cavity 300 according to the fourth embodiment. Therefore, relative displacement between the housing 10 and each of the cells 20 due to thermal deformation can be absorbed without separately including elastically deforming members.

Fifth Embodiment

Figure 9:
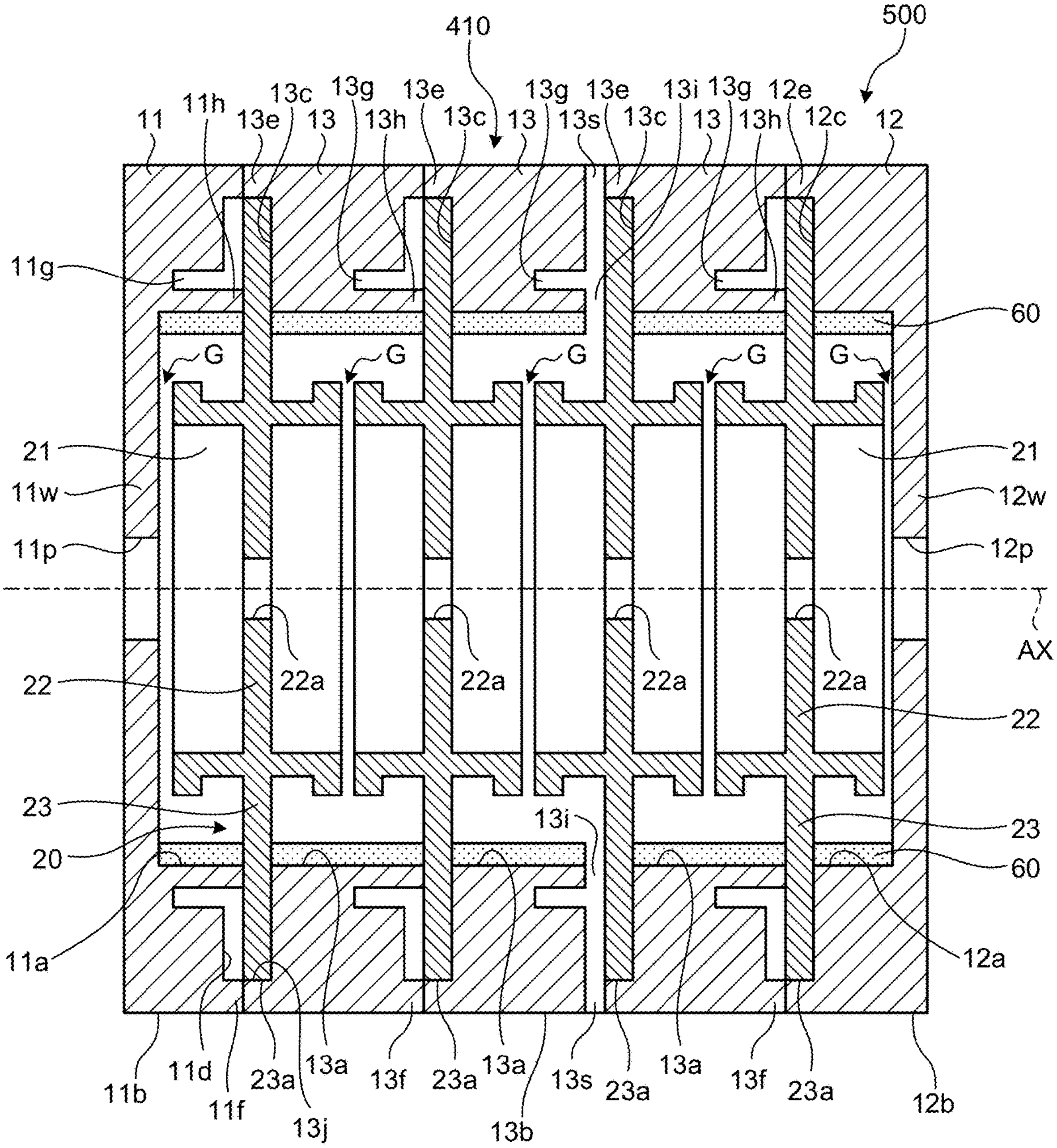
FIG. 9 is a sectional view illustrating an example of an accelerating cavity according to a fifth embodiment.

FIG. 9 is a sectional view illustrating an example of an accelerating cavity 500 according to a fifth embodiment. As illustrated in FIG. 9, the accelerating cavity 500 includes a housing 410 and the cells 20. Getter members 60 are arranged inside the housing 410. The getter members 60 absorb and remove, for example, foreign objects inside the housing 410. For the getter members 60, a material capable of absorbing and removing, for example, hydrogen components and oxygen components (water components) that remain when the air is evacuated from the accelerating cavity 500 is used. The getter members 60 may contain, for example, a metal such as titanium. The getter members 60 may be arranged in regions outside the corresponding grooves 13*g*.

In the accelerating cavity 500 according to the fifth embodiment, thus arranging the getter members 60 inside the housing 410 enables the getter members 60 to easily remove foreign objects inside the housing.

Sixth Embodiment

Figure 10:
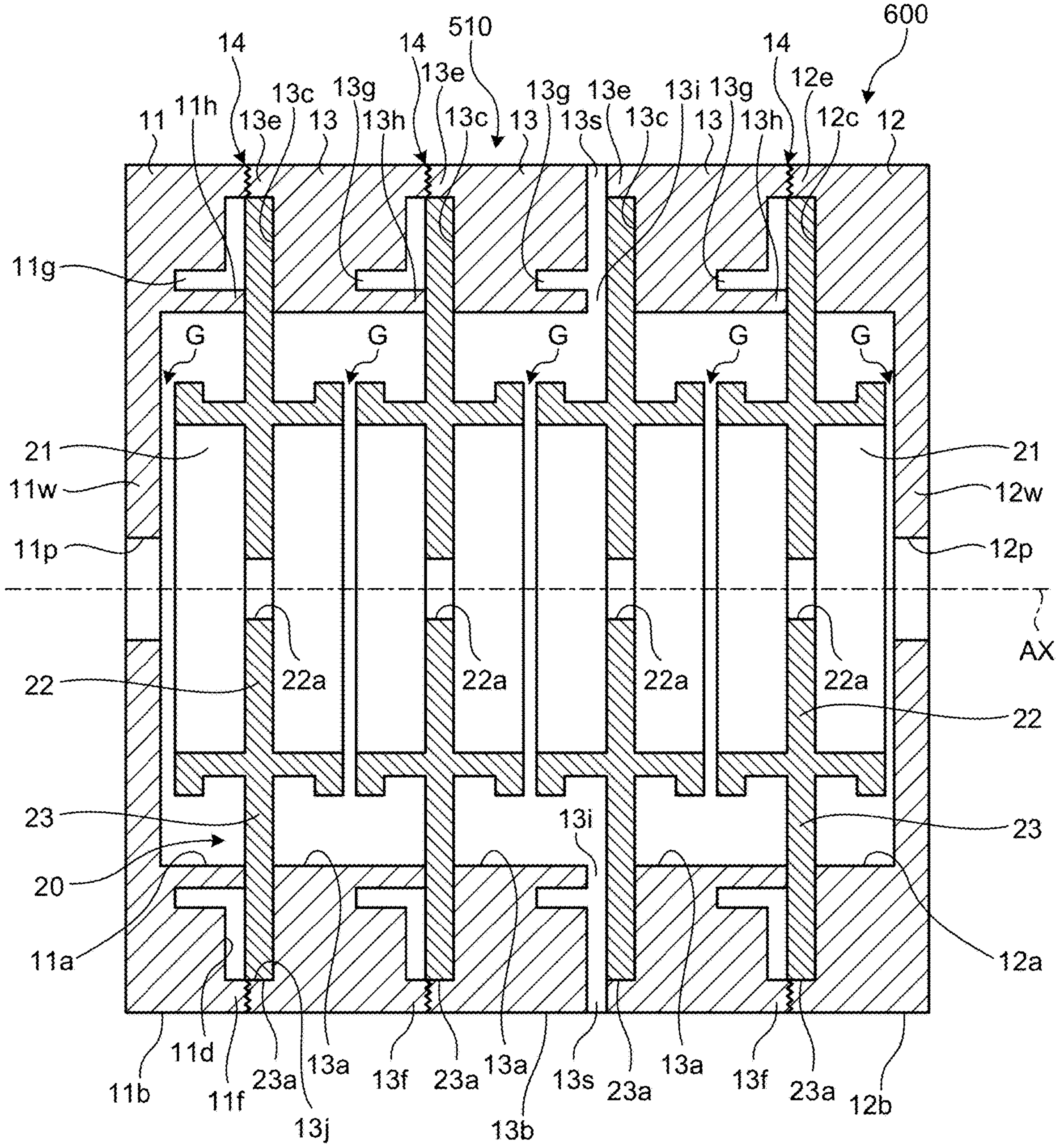
FIG. 10 is a sectional view illustrating an example of an accelerating cavity according to a sixth embodiment.

FIG. 10 is a sectional view illustrating an example of an accelerating cavity 600 according to a sixth embodiment. As illustrated in FIG. 10, the accelerating cavity 600 includes a housing 510 and the cells 20. The housing 510 has respective joined portions 14 of adjacent housing members joined to each other by electron beam welding or electroforming.

Thus, the accelerating cavity 600 according to the sixth embodiment has the housing members (11, 12, 13) joined together by electron beam welding or electroforming. Therefore, the housing members (11, 12, 13) can be reliably joined together while changes in dimensions thereof can be prevented with a reduced quantity of heat input thereto. In addition, the strength of the joint between the housing members (11, 12, 13) is enhanced, whereby thermal conduction is facilitated, which makes it possible to control the temperature of the entirety of the housing 10 by cooling parts thereof.

The technical scope of the present invention is not limited to the above embodiments and may be changed as appropriate without departing from the gist of the present invention. For example, while a structure in which each of the annular parts 23 is sandwiched inside the housing 10 with corresponding ones of the salient parts 11*h* and 13*h* and a corresponding one of the entrance side end surfaces 13*c* and 12*c* making contact with the annular part 23 is used as an example for describing each of the above embodiments, this example is not limiting. For example, the annular part 23 and each corresponding one of the salient parts 11*h* and 13*h* may be spaced from each other by having the annular part 23 joined to a corresponding one of the entrance side end surfaces 13*c* and 12*c*. In this case, a structure in which the salient parts 11*h* and 13*h* are not provided may be employed.

For example, while a structure in which the communication parts formed by the recessed parts 13*i* and the slit parts 13*s* are provided in the trunk members 13 of the housing 10 is used as an example for describing the above embodiments, this example is not limiting. The recessed parts 13*i* and the slit parts 13*s* may not necessarily be provided, for example. In this case, the air inside the housing 10 can be evacuated through the opening 11*p* and the opening 12*p*. The individual trunk members 13 may be configured to have different structures from one another as to whether or not the recessed parts 13*i* and the slit parts 13*s* are provided.

In addition, while description is given using, as an example, a case where outside installations, such as the flow path members 30, are used when parts of the above accelerating cavity are cooled, this example is not limiting. For example, a structure having a flow path formed inside the housings 10, 110, 210, 310, 410, or 510 and having a coolant flowing through the flow path inside the housing may be employed.

Furthermore, for example, the structure of each of the embodiments may have electromagnetic wave absorbers of a material such as ferrite or SiC provided in respective regions of the trunk members 13 that are more external than the corresponding grooves 13*g*. According to this structure, components that are included among electromagnetic waves (wake fields) excited when the charged particles M pass through the accelerating cavity and that have different frequencies than a frequency for the acceleration mode leak out into the regions more external than the grooves 13*g* and attenuate by being absorbed by the electromagnetic field absorbers, whereby impacts of the components on an accelerating electric field that accelerates the charged particles M. Therefore, the charged particles M can be prevented from, for example, spreading out and having the trajectory thereof changed under the influence of wake fields, whereby the quality of the beam of the charged particles M can be maintained.

REFERENCE SIGNS LIST

AC ACCELERATOR
AX CENTRAL AXIS
BS BEAM SOURCE
CB CHAMBER
G GAP
M CHARGED PARTICLE
P PUMP
10, 110, 210, 310, 410, 510 HOUSING
11 ENTRANCE SIDE MEMBER
11*a*, 12*a*, 13*a* INNER CIRCUMFERENTIAL SURFACE
11*b*, 12*b*, 13*b*, 23*a* OUTER CIRCUMFERENTIAL SURFACE
11*d*, 13*d* EXIT SIDE END SURFACE
11*f*, 13*f* EXIT SIDE PROJECTING PART
11*g*, 13*g* GROOVE
11*h*, 13*h* SALIENT PART
11*i*, 13*i* RECESSED PART
11*p*, 12*p*, 22*a* OPENING
11*w*, 12*w* WALL PART
12 EXIT SIDE MEMBER
12*c*, 13*c*, 13*d*, 21*d* ENTRANCE SIDE END SURFACE
12*e*, 13*e* ENTRANCE SIDE PROJECTING PART
12*j*, 13*j* inner surface
12*k*, 12*m*, 13*k*, 13*m* SPACE
12*n*, 13*n* CYLINDRICAL PIECE PART
13 TRUNK MEMBER
13*s* SLIT PART
13*t* COMMUNICATION PART
14 JOINED PORTION
20 CELL
21 CYLINDRICAL PART
22 CIRCULAR DISC PART
23 ANNULAR PART
30 COVER PART
40 FLOW PATH MEMBER
41 COOLING MEDIUM
50 SPRING PART
51 BASE PART
52 INNER CIRCUMFERENTIAL PART
53 OUTER CIRCUMFERENTIAL PART
60 GETTER MEMBER
100, 200, 300, 400, 500, 600 ACCELERATING CAVITY

The invention claimed is:

1. An accelerating cavity comprising:

an electrically conductive cylindrical housing; and a plurality of cells made of a dielectric material and having openings in respective central portions of each of the plurality of cells through which charged particles are allowed to pass, each of the plurality of cells being arranged inside the electrically conductive cylindrical housing while being aligned in an axial direction of a central axis of the electrically conductive cylindrical housing, and sandwiched by the electrically conductive cylindrical housing in the axial direction of the central axis, wherein grooves each having a depth that is one fourth of a wavelength of radio frequency waves for an acceleration mode that propagate through each of the plurality of cells are provided on portions of the electrically conductive cylindrical housing that support each of the plurality of cells.

2. The accelerating cavity according to claim 1, wherein, while the electrically conductive cylindrical housing is formed of a plurality of housing members included in the electrically conductive cylindrical housing joined together in the axial direction of the central axis, one of the cells is sandwiched between adjacent housing members.

3. The accelerating cavity according to claim 2, wherein the plurality of housing members are joined together by electron beam welding or electroforming.

4. The accelerating cavity according to claim 1, wherein the plurality of cells are arranged with a gap between adjacent cells in the axial direction of the central axis.

5. The accelerating cavity according to claim 1, wherein the electrically conductive cylindrical housing includes a communication part causing inside and outside of the electrically conductive cylindrical housing to communicate with each other in a radial direction perpendicular to the central axis.

6. The accelerating cavity according to claim 5, wherein the communication part is formed in a slit shape along an outer circumferential direction of the electrically conductive cylindrical housing.

7. The accelerating cavity according to claim 5, wherein each of the plurality of cells is arranged with part of each of the plurality of cells exposed outside the electrically conductive cylindrical housing through the communication part, and the accelerating cavity further comprises:

a cover part covering an outer surface of a portion of each of the plurality of cells, the portion being exposed to the communication part; and a flow path member arranged in contact with the cover part and having a cooling medium flowing in the flow path member.

8. The accelerating cavity according to claim 1, further comprising an elastically deforming part configured to impart elastic force to the corresponding cell inward in a direction perpendicular to the central axis.

9. The accelerating cavity according to claim 8, wherein the elastically deforming part is integral with the electrically conductive cylindrical housing.

10. The accelerating cavity according to claim 1, further comprising a getter member provided inside the electrically conductive cylindrical housing and configured to remove a foreign object in the electrically conductive cylindrical housing.

* * * * *